United States Patent [19]

Masunaga et al.

[11] Patent Number: 4,533,241
[45] Date of Patent: Aug. 6, 1985

[54] DISTANCE MEASURING DEVICE AND AUTOMATIC FOCUSING SYSTEM USING SAME

[75] Inventors: Makoto Masunaga; Hideo Taka, both of Tokyo, Japan

[73] Assignee: Canon Kabushiki Kaisha, Tokyo, Japan

[21] Appl. No.: 397,880

[22] Filed: Jul. 13, 1982

[30] Foreign Application Priority Data

Jul. 22, 1981 [JP] Japan ................................. 56-114851

[51] Int. Cl.³ ............................ G01C 3/10; G03B 7/08
[52] U.S. Cl. ......................................... 356/1; 354/403
[58] Field of Search ....................... 356/1, 4; 354/403; 250/201

[56] References Cited

U.S. PATENT DOCUMENTS

| | | | |
|---|---|---|---|
| 4,274,735 | 6/1981 | Tamura et al. | 356/1 |
| 4,330,202 | 5/1982 | Yokota | 356/1 |
| 4,365,878 | 12/1982 | Tokuda et al. | 354/403 |
| 4,429,967 | 2/1984 | Tokuda et al. | 356/1 |

Primary Examiner—S. C. Buczinski
Attorney, Agent, or Firm—Toren, McGeady, Stanger, Goldberg & Kiel

[57] ABSTRACT

In the disclosed measuring device, a projecting arrangement projects radiation modulated at a predetermined frequency toward an object and a sensing arrangement senses the radiation reflected by and coming from the object for producing an output signal indicative of the energy intensity of the received radiation. The projecting arrangement and sensing arrangement are moved relative to each other to scan the object while a converter converts the output signal of the sensing arrangement into digital data in synchronism with the modulation of the radiation being projected by the projection arrangement. The digital data is processed each predetermined number of cycles for producing an electrical output related to the change in energy intensity of the reflected radiation.

6 Claims, 5 Drawing Figures

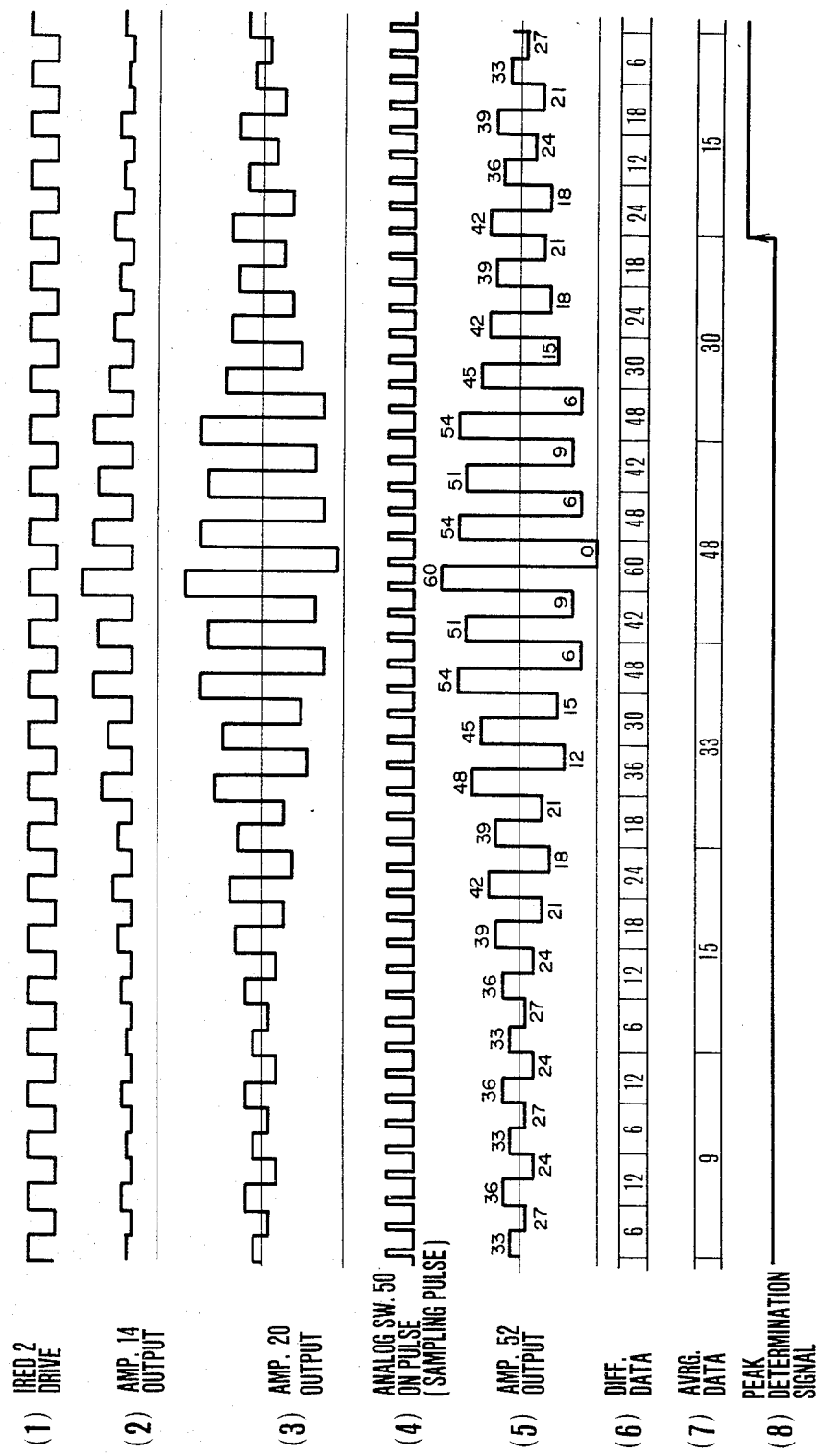

DISTANCE MEASURING DEVICE AND AUTOMATIC FOCUSING SYSTEM USING SAME

BACKGROUND OF THE INVENTION

1. Field of the Invention:

This invention relates to a distance measuring device and an automatic focusing system using the distance measuring device. More particularly, the invention relates to a novel, infrared ray projecting type distance measuring device which is capable of reducing the need for an external circuit arrangement and achieving improvement in the tolerance of the system using the device. The invention also relates to an automatic focusing arrangement using this novel distance measuring device.

2. Description of the Prior Art:

Various kinds of distance measuring devices have been known and put to practical use. Of these conventional devices, active type infrared ray projecting distance measuring devices are more capable of measuring distances in dark place, because they are arranged to perform the trigonometric measurement by projecting infrared rays (or infrared light). The distance measuring device of this type, therefore, can be advantageously applied to an automatic focusing system of a camera or the like and is particularly advantageous for a camera of the type incorporating a flash device.

However, in order to detect the reflection of projected infrared light coming from an object whose distance is to be measured by isolating it from other disturbing light, it is necessary to carry out signal processing for synchronous detection, peak detection, etc. This results in a complex circuit arrangement which then makes it difficult to lessen external circuit arrangements even in cases where integrated circuits are employed.

In the accompanying drawings, FIG. 1 schematically shows the operating principle of conventional active, infrared ray projecting type distance measuring devices. The device shown comprises an infrared ray emitting diode 2 (hereinafter called IRED for short) which is arranged to project infrared light (or rays) to an object 6 through a light projecting optical system 4; and a light sensitive element 8 which receives reflected light coming from the object 6 through a light receiving optical system 10 and an infrared transmitting filter 12. With the device arranged in this manner, the IRED 2 is arranged to be moved by some suitable known means which is not shown, for example, in the direction of arrow A from a position a to another position b. The infrared light is projected along an optical path c when the IRED 2 is in the position a and along another optical path d when the IRED is in the other position b. Therefore, the intensity of the infrared rays to be sensed by the light sensitive element 8 becomes highest when the light is projected along an optical path e leading to the object 6 during the movement of the IRED 2. Assuming that the distance is to be measured on the basis of the principle of trigonometric distance measurement, the angle of projection, i.e. the moving position of IRED 2 at which the light sensitive element 8 most strongly senses the intensity of the infrared rays corresponds to a distance to the object. Since this operation is well known, further details of the operating principle of the conventional device are omitted.

The above description merely covers the principle of a conventional device. In actual applications of the device, however, the effect of external light cannot be ignored in spite of the use of the infrared transmitting filter 12. To solve this problem, in projecting the infrared light from the IRED 2, the infrared light is modulated while, at the light sensitive element 8, the reflected infrared light is detected through a synchronous detection process.

FIG. 2 shows, by way of example, a circuit arrangement to perform this synchronous detection. This circuit includes a light receiving amplifier 14 which is arranged to produce an output by converting a photo current flowing through the light sensitive element 8 into a voltage through a feedback resistor 16; a capacitor 18 which cuts the DC component of the output of the light receiving amplifier 14; a buffer amplifier which determines the level of the AC component after the DC component has been cut; a drive circuit 32 which modulates the IRED 2 by causing it to flicker at a frequency of about 10 KHz; a sample and hold circuit 22 which is arranged to sample and hold the output of the buffer amplifier 20 when the IRED 2 is lit; another sample and hold circuit 24 which is arranged to sample and hold the output of the buffer amplifier 20 when the IRED 2 is extinct and to produce an output by inverting it; an operational amplifier 26 which adds up the outputs of the sample and hold circuits 22 and 24; a capacitor 28 for a low-pass filter which cuts the high frequency component of the output of the operational amplifier 26; and a buffer amplifier 30 for producing an output. The sample and hold circuits 22 and 24 are controlled by the pulses produced by the drive circuit 32.

The operation of the circuit arrangement of the prior art device shown in FIG. 2 is as shown in the timing chart of FIG. 3. FIG. 3(1) shows the on and off timing of the IRED 2. FIG. 3(2) shows the output signal of the light receiving amplifier 14. FIG. 3(3) shows the output signal of the buffer amplifier 20. FIG. 3(4) shows the sampling pulses applied to the sample and hold circuit 22 by the drive circuit 32. FIG. 2(5) shows the sampling pulses applied to the sample hold and circuit 24 by the drive circuit 32. FIG. 3(6) shows the sample and hold output signal of the sample and hold circuit 22. FIG. 3(7) shows the sample and hold output signal of the sample and hold circuit 24. FIG. 3(8) shows the output signal of the operational amplifier 26. FIG. 3(9) shows the output signal of the buffer amplifier 30.

When reflected infrared rays strike the light sensitive element 8 according to the on-and-off operation of the IRED 2, a photo current in which an exterior light component and the reflected infrared light overlap flows through the light sensitive element 8. This photo current is voltage converted through the resistor 16 of the light receiving amplifier 14 into a voltage signal as shown in FIG. 3(2). The voltage signal then has the DC component thereof cut through the capacitor 18 and the buffer amplifier 20 and is taken out as an AC signal as shown in FIG. 3(3). Meanwhile, the sample and hold circuits 22 and 24 to which this AC signal is to be supplied respectively receive signal inputs as shown in FIG. 3(4) and (5). These signal inputs are supplied to the circuits 22 and 24 according to the lighting and extinction timing of the IRED 2 as sampling pulses respectively. Accordingly, as a result of their sample and hold actions, the circuits 22 and 24 respectively produce sample and hold signals as shown in FIGS. 3(6) and (7).

The outputs of the sample and hold circuits 22 and 24 are added at the operational amplifier 26. The output of the operational amplifier 26 is supplied to a lowpass filter with the waveform shown in FIG. 3(8). The low-pass filter which consists of the capacitor 28 and the buffer amplifier 30 removes a ripple component from the input to give a wave form as shown in FIG. 3(9).

Therefore, when the IRED is moved in the direction of the arrow A, the output of the buffer amplifier produces a signal which reaches a peak when light flux projected from the IRED 2 just impinge upon the distance measuring object 6. Then, it is possible either to measure a distance or to allow a camera or the like to perform an automatic focusing action by correlating the peak position thus obtained with the moving position of the IRED 2. However, in accordance with this arrangement, the DC component blocking capacitor 18, the capacitors in the circuits 22 and 24 used for sampling and holding and the capacitor 28 for the low-pass filter remain an external circuit even when the major part of the circuit arrangement is composed of integrated circuits. Besides, the arrangement to detect the peak of the output of the buffer amplifier 30 necessitates use of an additional capacitor for a peak holding action. In addition to that, the number of resistors required for adjustment must be also taken into account. Further, since signal processing is always accomplished by a real time operation, a data processing concept or an attempt to store the results of distance measurement cannot easily be carried out electrically but generally necessitates provision of either a mechanical converting arrangement or a memory arrangement.

Therefore, arrangement to connect a distance measuring device to the automatic focusing system of a camera or the like has unconditionally been limited to a connection arrangement in which an IRED and a lens are synchronously moved and the lens is brought to the stop at a peak position of infrared light received. This inevitably has limited the latitude allowable to the specification of a camera or the like.

SUMMARY OF THE INVENTION

This invention is directed to the solution of the problem of the prior art mentioned in the foregoing. It is therefore a general object of the invention to provide a distance measuring device and an automatic focusing system using the distance measuring device which eliminates the shortcomings of the prior art devices by digitalizing the major part of a signal processing system to permit reduction in external circuit arrangement and an increase in system tolerance.

More specifically stated, the object of the invention is to provide a distance measuring device of the infrared ray projecting type wherein a modulated infrared light received at a light sensitive element is A/D converted and is subjected to a digital operation process; and exclusion of analog factors results in improved noise-proof capability and allows a greater latitude to the specification for application of the device to an automatic focusing system of a camera or the like.

To attain this object, a preferred embodiment of the invention comprises means for projecting a modulated infrared light on an object; means for receiving a reflected infrared light from the object; A/D converting means which converts the output of the sampling means into a digital value in synchronism with the modulation of the modulated infrared light; and computing means which computes the output of the A/D converting means every time the converting means performs A/D conversion a plural number of times.

The above and further objects, features and advantages of the invention will become apparent from the following detailed description of the preferred embodiment thereof taken in connection with the accompanying drawings.

BRIEF DESCRIPTION OF THE DRAWINGS

FIG. 5 is a timing chart showing the operation of the arrangement shown in FIG. 4.

DETAILED DESCRIPTION OF PREFERRED EMBODIMENT

Figure 1:
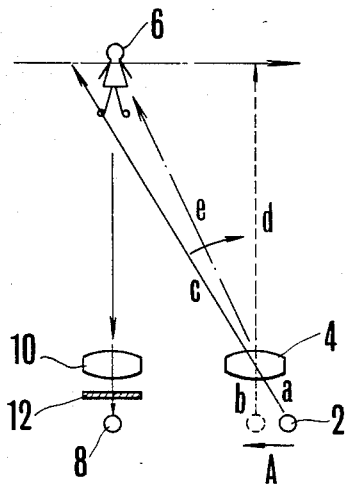
FIG. 1 is a schematic illustration of the conventional active type infrared light projecting distance measuring device.
Figure 2:
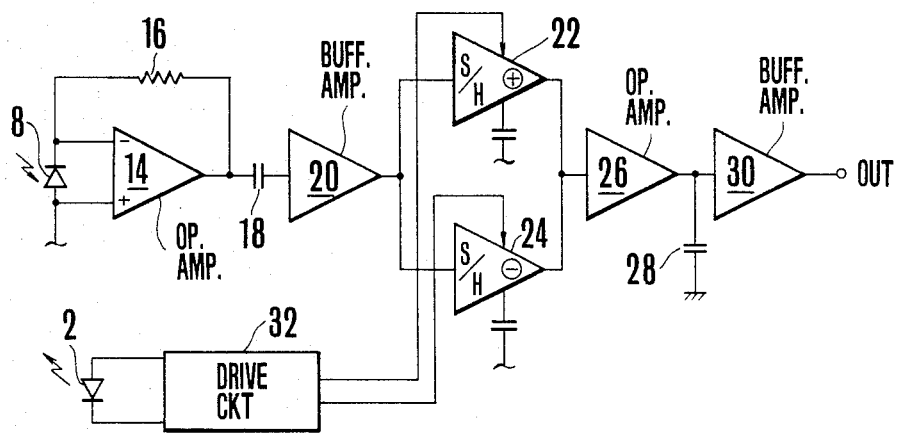
FIG. 2 is a circuit diagram showing an example of a synchronous detection circuit used in the arrangement shown in FIG. 1.
Figure 3:
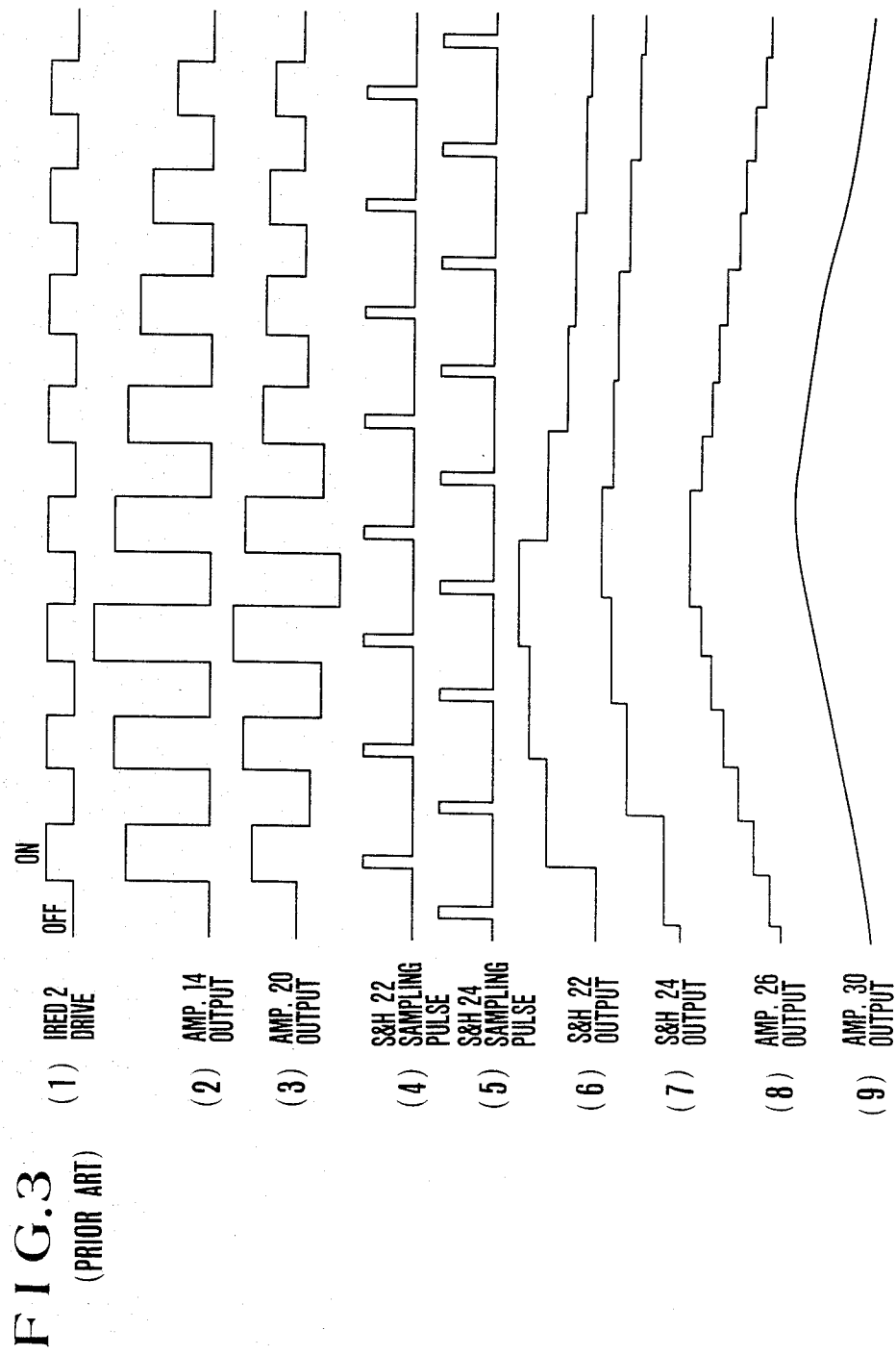
FIG. 3 is a timing chart showing the operation of the circuit arrangement shown in FIG. 2.
Figure 4:
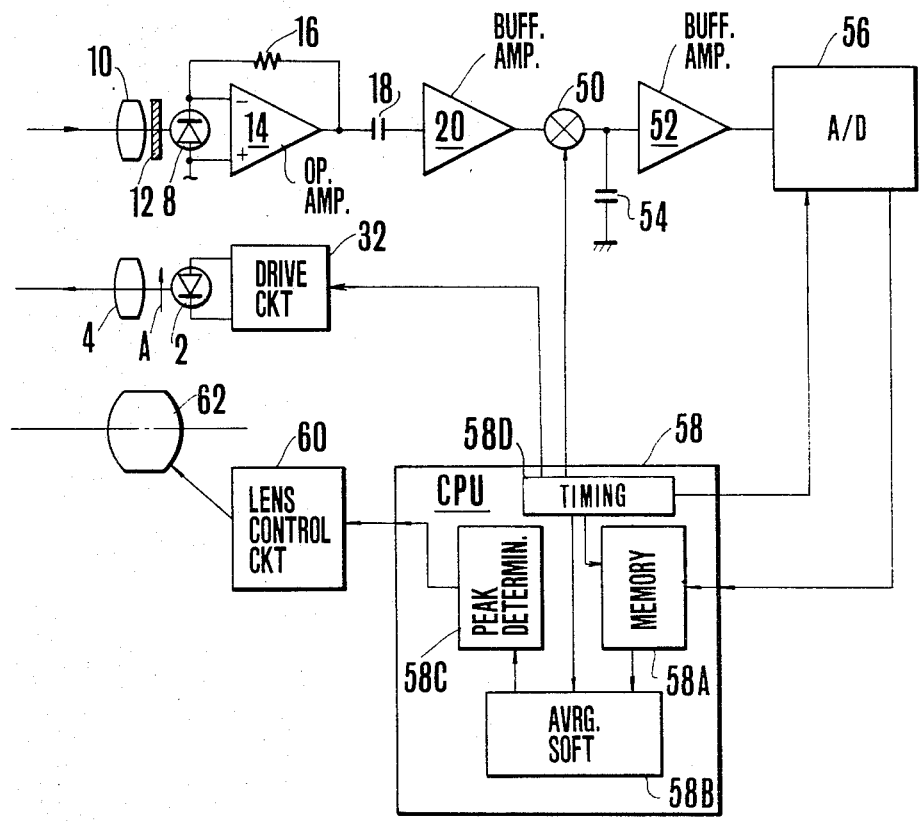
FIG. 4 is a block diagram showing an embodiment of the invention.

Referring to FIG. 4 which shows a preferred embodiment of the invention, the components indicated by the same reference numerals as those of FIGS. 1 and 2 are identical with the corresponding components shown in FIGS. 1 and 2.

In the embodiment shown in FIG. 4, an analog switch 50 holds the output signal of a buffer amplifier 20 at a sampling and holding capacitor 54 in response to sampling pulses coming from a central processing unit (CPU) 58. A buffer amplifier 52 is disposed at the output stage of sample hold. An A/D converter 56 converts the output signal of the buffer amplifier 52 into a digital value in response to timing pulses coming from CPU 58. The digital signal produced from the A/D converter 56 is processed and a focus position is computed therefrom by the CPU 58 which also functions to control a lens. A lens control circuit 60 controls a photo taking lens 62 to adjust it into a focus position determined by the CPU 58.

The embodiment which is arranged as described above operates as shown in FIG. 5 which shows the operation in a timing chart. FIG. 5(1) shows the on-and-off timing of the IRED 2; FIG. 5(2) the output signal of the light receiving amplifier 14; FIG. 5(3) the output signal of the buffer amplifier 20; FIG. 5(4) on-pulses (sampling pulses) which is produced by the CPU 58 and turns the analog switch 50 on; FIG. 5(5) the output signal of the buffer amplifier 52; FIG. 5(6) a train of data resulting from subtraction of an output signal of the A/D converter 56 obtained when the IRED 2 is off from another output signal of the converter 56 obtained when the IRED 2 is on; FIG. 5(7) a train of average data obtained by averaging values obtained from sampling carried out four times; FIG. 5(8) a peak judging signal based on the data train shown in FIG. 5(6).

In the arrangement of FIG. 4, the IRED 2 is turned periodically on and off as shown in FIG. 5(1) by the drive circuit 32 to produce a modulated infrared light. The modulated light from the IRED 2 is projected toward an object whose distance is to be measured while the IRED 2 is being moved, by some known means which is not shown, in the direction of arrow A. In this operation, the intensity of received infrared rays incident on the light sensitive element 8 at one moving position of the IRED 2 varies from their intensity at another moving position of the IRED 2 as the distance to the object varies. When, for example, the intensity of the infrared rays incident upon the light sensitive element 8 becomes maximum with the IRED 2 coming to a point halfway in its travel, the output of the light receiving amplifier 14 which is connected to the light sensitive element 8 appears as shown in FIG. 5(2). This output contains both an exterior light component incident upon the light sensitive element 8 and a reflected infrared light coming from the distance measuring object. Therefore, the exterior light component would be also amplified by mere amplification of the output. To solve this problem, the exterior light component, i.e. a DC component, is arranged to be blocked by the DC blocking capacitor 18. As a result of DC blocking, an AC signal which is as shown in FIG. 5(3) is obtained from the buffer amplifier 20. The major portion of this AC signal is derived from the flickering operation of the IRED 2. The output of the buffer amplifier 20, feeds the series connected analog switch 50 which is connected to a timing block 58D in the CPU 58 to receive the on-pulses (sampling pulses) shown in FIG. 5(4). While this analog switch 50 is conductive, the output level of the buffer amplifier 20 is held by the capacitor 54. As a result of this the buffer amplifier 52 produces a sample hold output signal as shown in FIG. 5(5). This signal is converted into a digital signal by the A/D converter 56 at every sample hold action on the basis of the timing pulses produced from the timing block 58D in the CPU 58. The digital signal thus obtained is stored at a memory block 58A within the CPU 58 in the following manner: In the CPU 58, the data obtained by subtracting the A/D converted data obtained when the IRED 2 is off from the A/D converted data obtained when the IRED 2 is on is stored as data corresponding to the intensity of the infrared rays incident upon the light sensitive element 8 at the memory block 58A in accordance with the timing pulses from the timing block 58D. A train of the resultant data thus obtained is as shown in FIG. 5(6).

Since the A/D converted data obtained at every sampling varies due to a noise or a quantization error, the intensity of the infrared rays (or light) is not always accurately traced. Accordingly, peak determination under such a condition might lead to an error. To avoid such an erroneous peak determination, a computation process in accordance with the algorithm is carried out as follows:

An averaging software block 58B which is provided within the CPU 58 is operated in accordance with the timing pulses from the timing block 58D to take therein from the memory block 58A the data obtained through the sampling and holding and A/D converting actions performed a number of times (8 times, that is, 4 cycles of the on-and-off operation of the IRED 2 in the case of this particular embodiment). The results of this are averaged. The resultant data thus obtained are considered to represent the values of intensity of the incident infrared rays obtained at specific points of time. The average data obtained through the computation process are shown in FIG. 5(7). As will be apparent from FIGS. 5(6) and 5(7), with such an averaging routine carried out, the data become free from fluctuation.

The above described computing operation is carried out parallel to the movement of the IRED 2 and the forward movement of the photo taking lens 62. At the CPU 58, sampling of data relative to the everchanging received infrared rays and the average value computing operation are repeated and the peak is determined by comparison of data. To determine this peak, a peak determing block 58C incessantly compares the latest average-value output data with a preceding average value output data every time an average value of data is obtained. The peak is determined at the point of time when the latest data become smaller than the preceding data.

As described above, at the CPU 58, the peak determination is made by the peak determining block 58C while the train of data as shown in FIG. 5(7) are being computed by the averaging software block 58B. The photo taking lens 62 is brought to a stop at a position corresponding to the peak, so that the lens 62 can be automatically focused on the object 6.

More specifically stated, the CPU 58 supplies a peak determination pulse as shown in FIG. 5(8) to the lens control circuit 60 at the time the peak is determined. Upon receipt of the peak determination pulse, the lens control circuit 60 immediately operates a magnet or the like to stop the photo taking lens 62 which is moved forward by means of a spring or the like concurrently with the movement of the IRED 2. Incidentally, the lens which is being moved by a pulse motor or moved by a motor may be brought to a stop by a pulse stopping arrangement or a braking arrangement.

Further, in the specific embodiment described above, the number of the on-and-off operating cycles of the IRED 2 used for averaging is set at 4. However, the invention is not limited to that. In practising the present invention, the peak determination can be more accurately made by using data based on a greater number of sampling data.

The operation of the CPU 58 is an arithmetic routine which does not involve any special technical factors but can be readily accomplished by a known microprocessor. Therefore, the details of the operation of the CPU 58 is not described herein.

This particular embodiment employs real-time type distance measurement in which the IRED 2 is arranged to be moved together with a photo taking lens for automatic focusing. However, the invention is not limited to such arrangement. In accordance with the invention, the IRED 2 may be moved prior to the movement of the lens 62 independently of the latter to permit digital storing of the peak position. Therefore, the invention is applicable to system arrangement fraught with expanding possibilities.

With the major part of the signal processing system digitalized as described in the foregoing, the invention permits simplification of the circuit arrangement; reduction in the number of external discrete components; and the use of integrated circuits. The distance measuring device and the automatic focusing system according to the invention not only excels economically but also allows system arrangement to have a great tolerance.

In the embodiment described in the foregoing, the light projecting means 2 is arranged to be moved. However, this arrangement may be replaced with an arrangement to move the light projecting optical system 4 disposed in front of the light projecting means 2 or with an arrangement to move the light receiving optical system 10 or the light receiving means 8 within the light receiving system 8, 10 and 12 1 or both, while the light projecting system 2 and 4 is arranged to be stationary. It is also possible to have both the light projecting and receiving systems movable without departing from the spirit of the invention. It should be understood, what is important in accordance with the present invention is the provision of an arrangement required for effecting relative displacement between the light reflected by the object and the light receiving means which detects the reflected light.

What we claim:

1. A device comprising:

scanning means for scanning the area of an object by projecting a beam of modulated radiation and directionally sensing the reflections of the projected beam along a path while moving the beam and the path relative to each other;

converting means for converting the radiation sensed by said scanning means into digital data in synchronism with the modulation of the radiation being projected by said scanning means; and means for processing the digital data formed by said converting means for every predetermined plurality of cycles of the digital conversion of said converting means;

said processing means including:

means for detecting the difference between the digital data formed by said converting means in each of the cycles, said difference detecting means producing difference data indicative of said difference; and means for averaging the difference data produced by said difference detecting means every predetermined plurality of cycles of the converting means, said averaging means being arranged for producing averaged difference data which varies in accordance with the change in the energy intensity of the projected radiation on said sensing means.

2. A device comprising:

projection means for projecting radiation modulated at a predetermined frequency onto an object;

sensing means for sensing the radiation reflected by and coming from the object and for producing an output signal indicative of the energy intensity of the received radiation;

control means for controlling said projection means to switch between an effective state and an ineffective state at said predetermined frequency so that the projection means projects the radiation modulated at the predetermined frequency;

converting means for converting the output signal of said sensing means into digital data in synchronism with the modulation of the radiation being projected by said projection means;

said converting means being arranged to convert the signal in each of said effective and ineffective states of the projection means to produce a plurality of cycles in which each cycle of the digital conversion by the converting means corresponds to one of the effective and one of the ineffective states of the projection means;

detecting means for detecting the difference between the digital data formed by said converting means in each of the cycles and producing difference data indicative of said differences; and averaging means for averaging the difference data produced by said difference detecting means each one of said plurality of cycles of the converting means, said averaging means being arranged for producing averaged difference data which varies in accordance with the change in the energy intensity of the projected radiation on said sensing means.

3. The device according to claim 2, wherein said processing means further includes;

means for determining, on the basis of the averaged difference data produced by said averaging means, when the energy intensity of the projected radiation on the sensing means becomes maximum during the relative movement between the reflected radiation and the sensing means, effected by said effecting means, said maximum determination means producing, as the output of the processing means, a characteristic output when the energy intensity of the projected radiation on the sensing means becomes the maximum.

4. The device according to claim 3, further comprising:

movable lens means; and means for positioning said lens means to a position corresponding to an operating state of said effecting means, where said maximum determination means produces the characteristic output.

5. The device according to claim 4, wherein said effecting means includes;

means for moving said projection means so that the relative movement between the reflected radiation and said sensing means is effected;

said positioning means being arranged to position said lens means to the position corresponding to a moving position of the projection means, where said maximum determination means produces the characteristic output.

6. The device according to claim 2, wherein said predetermined plural number is four.

* * * * *